Sept. 24, 1963  R. H. DUNHAM  3,104,885
EXPANDING COLLET FOR TURRET LATHES AND SCREW MACHINES
Filed Oct. 4, 1960  3 Sheets-Sheet 1

INVENTOR
Russell H. Dunham
BY
ATTORNEYS

Sept. 24, 1963 R. H. DUNHAM 3,104,885
EXPANDING COLLET FOR TURRET LATHES AND SCREW MACHINES
Filed Oct. 4, 1960 3 Sheets-Sheet 2
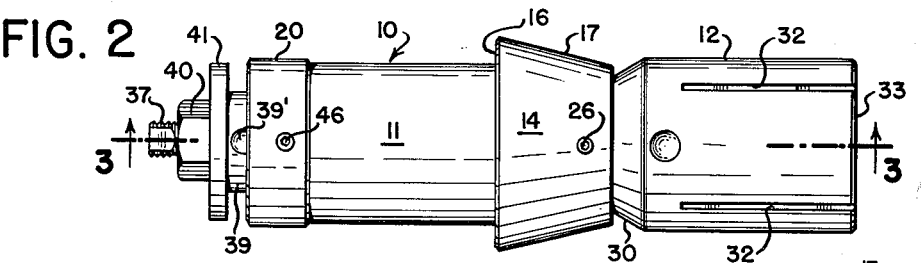
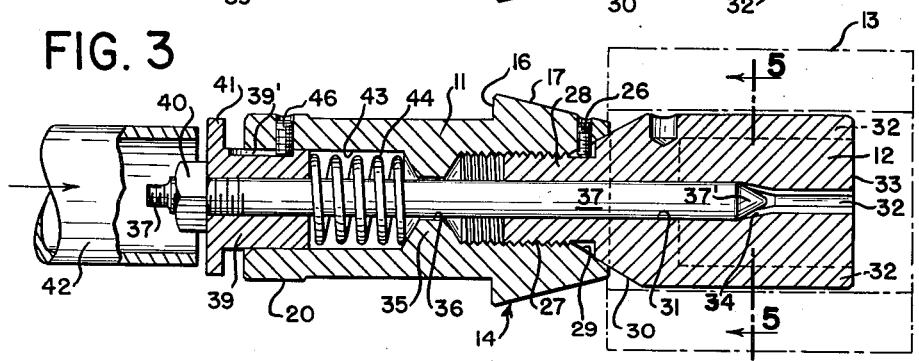
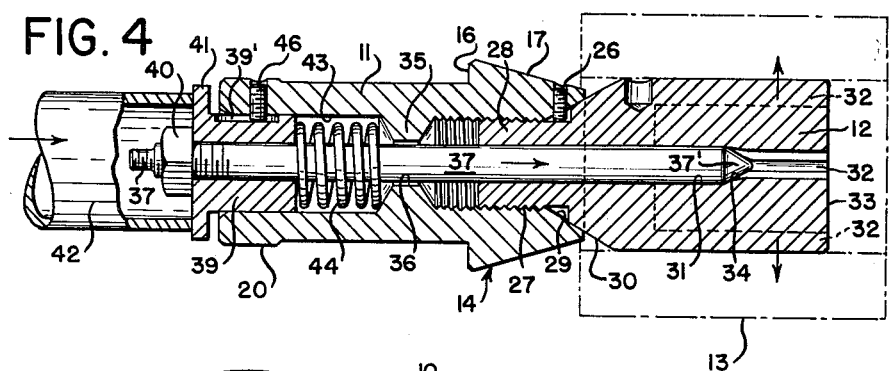
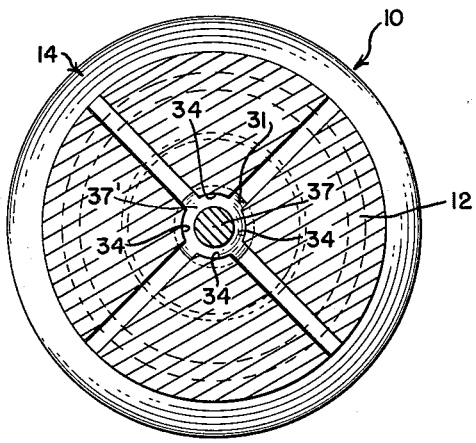
INVENTOR
Russell H. Dunham
BY
ATTORNEYS Sept. 24, 1963    R. H. DUNHAM    3,104,885
EXPANDING COLLET FOR TURRET LATHES AND SCREW MACHINES
Filed Oct. 4, 1960    3 Sheets-Sheet 3

INVENTOR
Russell H. Dunham
BY
ATTORNEYS

United States Patent Office 3,104,885
Patented Sept. 24, 1963

3,104,885
EXPANDING COLLET FOR TURRET LATHES AND SCREW MACHINES
Russell H. Dunham, New Fairfield, Conn., assignor to The Dunham Tool Company, Inc., a corporation of Connecticut
Filed Oct. 4, 1960, Ser. No. 60,346
2 Claims. (Cl. 279—2)

This invention relates generally to collets and more specifically to a collet having an expanding mandrel incorporating certain novel features and particularly adapted for use with automatic screw machines and turret lathes.

The present invention contemplates improvements in expanding collets specifically for use in automatic screw machines and turret lathes. An expanding collet is provided having a master collet portion with means for receiving interchangeable expanding mandrels, the particular mandrel being selected in accordance with the inside diameter of the part to be held. The master collet portion is constructed to be received within the standard spindle of either an automatic screw machine or turret lathe and has been provided in each case with a means for assuring automatic self-centering of the master collet within the spindle of the respective machine in which it is to be operated.

More specifically, an expanding collet is provided comprising a master collet portion and an expanding mandrel adapted for insertion within the part to be machined. The mandrel has a plurality of axial slots extending radially inwardly from its outer periphery to a central longitudinal passageway within the mandrel. Generally intermediate the length of the slots, the passageway forms a forwardly converging tapered seat adapted to coact against a matching conically shaped forward end of an expander rod extending through the passageway in the mandrel. Rearwardly therefrom the expander rod extends through the master collet portion to make a connection with the push tube of the machine tool (automatic screw machine or turret lathe) in which the master collet is mounted. When the expander rod is thrust against the tapered seat, the mandrel may be expanded, when desired, to hold the part to be machined.

Advantageously, the rearward end of the expander rod adjacent its connection with the push tube is held within a bushing slidably mounted in a cylindrical chamber within the master collet. A spring is disposed intermediate the bushing and interior wall portions of the master collet to assist in returning the expander rod to a rearward position out of immediate contact with the tapered seat within the mandrel, thus automatically permitting the mandrel to contract when pressure has been released from the push tube. Means are also provided for preventing rotation of the expander rod in the master collet and mandrel and for adjusting the distance which the expander rod may move forward into the mandrel.

As a further aspect of the invention, we have disclosed an expanding collet having a master collet portion and an expanding mandrel threadably secured within the master collet wherein the master collet has been constructed of hard machine steel, for example, 4130 steel, and the expanding mandrel is of a softer machineable steel. This arrangement possesses the advantage that the combined master collet and mandrel may be first mounted within the machine in which it is to be used and thereafter, the mandrel, when expanded, may be machined to a dimension slightly larger than the inside dimension of the part to be held. Thus, any lack of concentricity with respect to the part due either to inaccuracies of mounting the collet within the machine or because of axial misalignment of the mandrel in its threaded attachment with the master collet, will be corrected.

These and other aspects of the invention will become apparent upon a detailed examination of the following description of a particular embodiment and of the accompanying drawing, in which:

FIG. 2 is an exterior view of the expanding collet of the invention;

FIG. 3 is a cross-sectional view taken in the direction of the arrows 3—3 of FIG. 2, showing the mandrel in its contracted position;

FIG. 4 is a view similar to FIG. 3 showing the mandrel in its expanded position;

FIG. 5 is an end cross-sectional view taken through the mandrel in the direction of the arrows 5—5 of FIG. 3.

Figure 1:
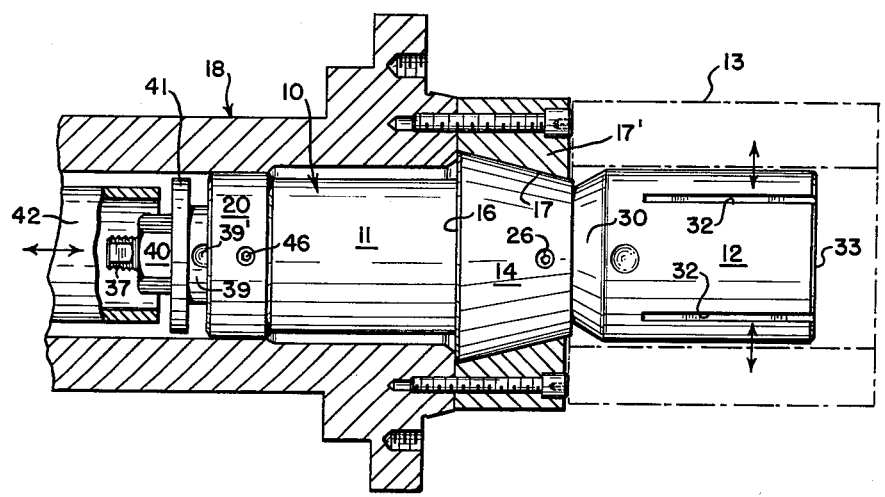
FIG. 1 is a view showing an expanding collet constructed according to the invention installed for operation in a turret lathe.

Referring now to the drawing, reference numeral 10 designates an expanding collet constructed according to the invention. The collet 10 comprises a master collet portion 11 and an expandable mandrel 12. The mandrel 12 is adapted for insertion within a part 13 which has been indicated in phantom, and holds the part while a machining operation is performed thereupon. In FIGS. 1–5, the master collet portion illustrated is adapted to be held by the spindle of a turret lathe and has been provided for this purpose with a radial collar 14 having a rearwardly facing shoulder 16.

The radial collar 14 forms a frusto-conical outer surface 17 which as shown has a taper matching the interior of the nose cap 17' of the spindle 18 of the turret lathe. The tapered surface 17 of the master collet 11 constitutes together with the raised annular surface 20 thereof, a machined surface for reception within the spindle 18 and nose cap 17'. The collar 14 and particularly its tapered surface constitutes a self-centering means coacting with the matching taper of the nose cap 17' to automatically center the collet within the spindle.

Figure 6:
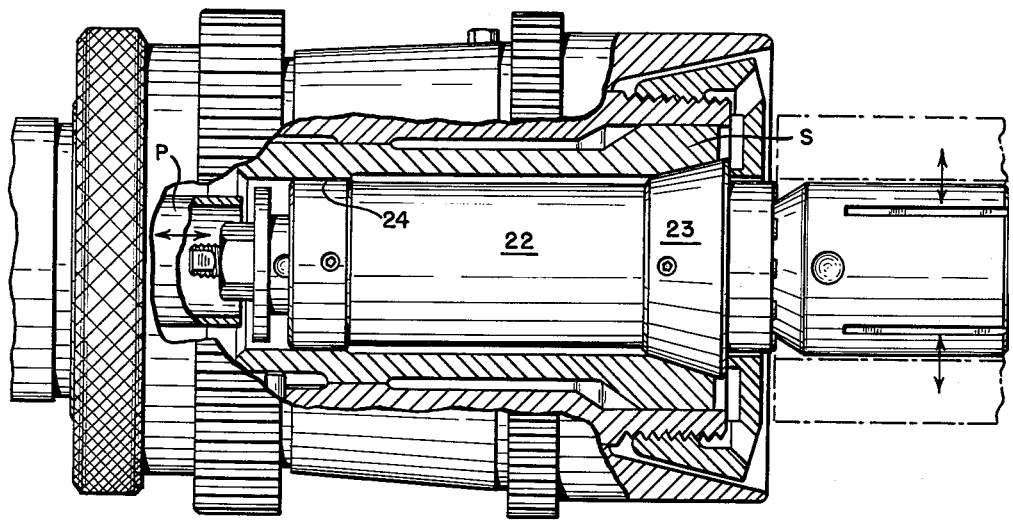
FIGS. 6 and 7 are views similar to FIG. 1 where a collet has been installed for operation in automatic screw machines.
Figure 7:
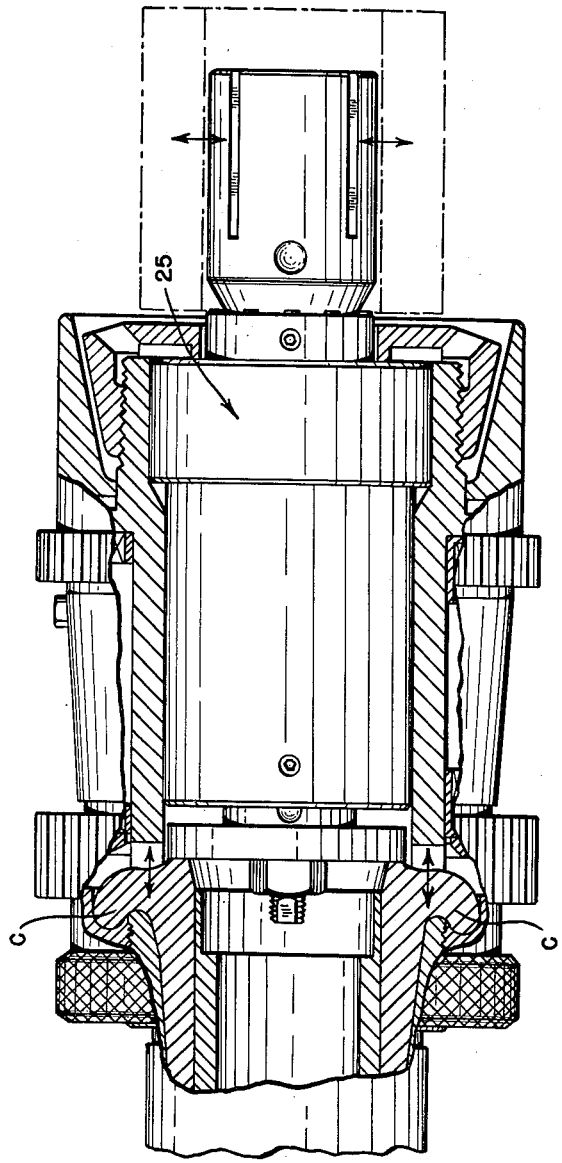

With respect to the expanding collet shown in FIG. 6, it will be seen that a master collet 22 has been illustrated having a forwardly disposed frusto-conical collar 23 and rearwardly, a peripheral surface 24, which match the internal construction of the spindle of an automatic screw machine, more specifically the closing sleeve S thereof for providing self-centering therein. In this model, the screw machine has a push tube P. In FIG. 7, a collet 25 has been illustrated installed for operation within another model automatic screw machine equipped with closing cams C. Normally, this screw machine includes a closing sleeve like that of FIG. 6. However, the master collet portion of the collet 25 of FIG. 7 will have an external dimension and shape conforming to that of a standard closing sleeve for this model machine and will be held within the spindle as shown. The cams C may then be operated against the rear of the collet 25 as would a push tube, as will appear presently. The master collet and mandrel portions of the automatic screw machine models shown in FIGS. 6 and 7 are in all respects internally constructed similar to the master collet and the mandrel shown in FIGS. 1–5 and consequently, further specific description will be directed to the embodiment of FIGS. 1–5.

Proceeding now with the specific description of the internal portions of the expanding collet 10, the master collet portion 11 thereof has been provided with an axial internally threaded bore 27 adapted for threaded engagement with a threaded portion 28 of the mandrel 12. The forward end of the master collet has an internally tapered surface 29 which matches the exterior tapered surface 30 of the mandrel 12, the surfaces 29, 30 cooperating to center the mandrel 12 within the master collet 11. When the parts are assembled, a lock screw 26 may be turned down to prevent further rotation of the mandrel respective of the master collet.

The mandrel 12 has been provided with a longitudinally aligned passageway 31 and a plurality (in the specific embodiment 4 having been shown) of axial slots 32 extending for a distance rearwardly from the face 33 thereof and communicating radially inwardly with the passageway 31. Wall portions of the passageway 31 generally intermediate the length of the slots 32 define a forwardly converging tapered camming seat 34.

The master collet 11 has an intermediate transverse wall 35 with a bore 36 running therethrough which is in axial alignment with the passageway 31 when the mandrel is secured to the master collet. An expander rod 37 is received within the bore 36 and the passageway 31 of the master collet and mandrel respectively and has a forward end 37' of generally conical shape which matches the tapered seat 34. The opposite end of the rod 37 is threadably secured within a cylindrical bushing 39. A lock nut 40 prevents rotation of the rod 37 relative to the member 39. The bushing 39 has a rearwardly disposed radial shoulder 41 adapted to abut the forward end of a push tube 42 of the turret lathe. A cylindrical chamber 43 is located within the master collet 11 and slidably receives forward portions of the bushing 39. A compression spring 44 is positioned about the rod 37 intermediate the bushing 39 and the transverse wall 35 normally to bias the rod 37 and the bushing 39 rearwardly, and thus, contract the mandrel 12. The member 39 has an axial groove or slot 44 cut into the periphery thereof and a set screw 46 is adapted for insertion within the groove 44 to prevent relative rotation of the bushing 39, the expander rod 37, and the master collet.

Advantageously, the master collet 11 will be constructed of tool steel, for example, 4130 steel or a steel of equivalent hardness. The expandable mandrel 12 and mandrels interchangeable therewith for holding various inside diameters of different parts for machining will be constructed of a relatively soft machineable tool steel. The mandrels may, for example, be manufactured of "dead soft" cold rolled steel or of number 1137 steel for example, which has been heat treated to an equivalent hardness. This arrangement permits supplying of a master collet which is extremely hard and durable and interchangeable expanding mandrels of various sizes for purposes of individually machining the mandrel to fit the particular machine and job for which it is to be used. This will be described in greater detail presently.

In operation, and in installing the expanding collet 10 within a turret lathe, chips and other foreign material will first be removed from the spindle and nose cap of the lathe. The spring-loaded bushing 39 will be pushed until the expander rod contacts the tapered seat in the expanding mandrel. It has been found that for proper operation, there should be, when contact is made between the surfaces 37' and 34 of the rod and seat respectively, a minimum of 1/16" space between the shoulder 41 and the master collet 11. This clearance is adjustable by loosening the nut 40 and turning the expander rod 37. The master collet 11 may then be assembled within the spindle of the turret lathe (see FIG. 1) as would a standard collet. With the expanding mandrel finger tight within the master collet the turret lathe's expander rod 37 is adjusted to thrust the forward end 37' of the expander rod against the tapered seat 34 to open the expanding mandrel between .005" and .010". The mandrel 12 will then be machined in the expanded position until the mandrel is approximately .001" larger than the inside diameter of the part to be held. The push tube may then be released and the mandrel will automatically contract by operation of the spring 44. The part to be held may then be positioned over the mandrel, the push tube closed to expand the mandrel and the part will be held accurately for machining. The operation of the collet shown in FIG. 6 is comparable and will therefore not be described in detail.

It will be understood that the foregoing description relates to a specific embodiment or embodiments and is therefore merely representative. Therefore, in order fully to appreciate the spirit and scope of the invention, attention is directed to the appended claims, in which:

I claim:

1. A workholding device for use with automatic screw machines and turret lathes comprising:
   (a) a cylindrical master collet housing having an externally tapered front end portion,
   (b) said collet housing having a rear end portion and an intermediate portion,
   (c) said front end portion defining an open threaded mandrel receptacle extending rearwardly to said intermediate portion,
   (d) said rear end portion defining an open cylindrical chamber extending forwardly to said intermediate portion,
   (e) said intermediate portion defining a bore communicating with said chamber and said mandrel receptacle,
   (f) a bushing means being secured within said chamber for limited axial movement relative thereto,
   (g) a spring means acting between said intermediate portion and said bushing means to bias said bushing rearwardly away from said intermediate portion,
   (h) an expandable mandrel having an expandable holding portion and a threaded mounting portion being adapted to be received by said receptacle,
   (i) said mandrel defining a longitudinal bore extending therethrough, said bore being convergently tapered in said holding portion,
   (j) said holding portion defining a plurality of axially extending radial slots,
   (k) said slots cooperating with said longitudinal bore to define a plurality of expandable jaws,
   (l) an expander rod having a conically shaped forward end being adapted upon forward movement to cooperate with said convergently tapered bore to expand said mandrel jaws,
   (m) said expander rod being supported by said intermediate housing portion and said bushing, and
   (n) said expander rod being fixedly secured to said bushing to form with said collet housing and said spring means an integral master collet unit.

2. A workholding device in accordance with claim 1, in which:
   (a) said rear end portion of said master collet includes locking set screw means,
   (b) said bushing means includes shoulder portions, and
   (c) said set screw means and said shoulder portions cooperate to limit and define the extent of travel of said bushing means.

References Cited in the file of this patent

UNITED STATES PATENTS

| | | |
|---|---|---|
| 2,399,831 | Schmidt | May 7, 1946 |
| 2,464,156 | Sandersen | Mar. 8, 1949 |
| 2,494,899 | Ross | Jan. 17, 1950 |
| 2,588,354 | Buescher | Mar. 11, 1952 |
| 2,851,274 | Greer | Sept. 9, 1958 |
| 2,970,843 | Bourguignon | Feb. 7, 1961 |